United States Patent [19]

Nakamatsu et al.

[11] Patent Number: 5,367,075

[45] Date of Patent: Nov. 22, 1994

[54] ANTHRAPYRIDONE COMPOUNDS, THEIR PRODUCTION PROCESS AND THEIR USE

[75] Inventors: Toshio Nakamatsu, Osaka; Yoshitugu Egashira, Hyogo; Yasuyuki Suzuki, Osaka, all of Japan

[73] Assignees: Sumitomo Chemical Company, Limited; Sumika Fine Chemical Company, Ltd., both of Osaka, Japan

[21] Appl. No.: 167,443

[22] Filed: Dec. 14, 1993

Related U.S. Application Data

[63] Continuation of Ser. No. 773,129, Oct. 8, 1991, abandoned, which is a continuation of Ser. No. 430,663, Nov. 11, 1989, abandoned, which is a continuation of Ser. No. 126,596, Nov. 30, 1987, Pat. No. 4,902,798.

[30] Foreign Application Priority Data

Dec. 1, 1986 [JP] Japan ................. 61-287093
May 29, 1987 [JP] Japan ................. 62-135695
Sep. 3, 1987 [JP] Japan ................. 62-221755

[51] Int. Cl.$^5$ .............................................. C09B 5/14
[52] U.S. Cl. .................................................. 546/76
[58] Field of Search ...................................... 546/76

[56] References Cited

U.S. PATENT DOCUMENTS

| | | | |
|---|---|---|---|
| 2,012,228 | 8/1935 | Buxbaum | 546/76 |
| 2,195,067 | 3/1940 | Weinand et al. | 546/76 |
| 2,584,367 | 2/1952 | Randall et al. | 548/478 |
| 2,759,939 | 8/1956 | Bucheler et al. | |
| 3,436,401 | 4/1969 | Pfister. | |
| 3,534,038 | 10/1970 | Machatzke et al. | 546/76 |
| 3,767,671 | 10/1973 | Klebe et al. | 548/478 |
| 3,980,609 | 9/1076 | Neef et al. | 546/76 |
| 4,088,572 | 5/1978 | Cooper et al. | 558/258 |
| 4,745,174 | 5/1988 | Pruett et al. | 546/76 |
| 4,902,798 | 2/1990 | Nakamatsu et al. | 546/76 |

FOREIGN PATENT DOCUMENTS

| | | |
|---|---|---|
| 1026132 | 4/1953 | France ............ 546/76 |
| 2217321 | 9/1974 | France. |
| 2269566 | 11/1975 | France. |
| 41-232 | 12/1971 | Japan ............ 552/258 |
| 49-20744 | 5/1974 | Japan. |
| 396833 | 1/1966 | Switzerland. |
| 1454631 | 11/1976 | United Kingdom. |
| 1457713 | 12/1976 | United Kingdom. |

OTHER PUBLICATIONS

Chemical Abstracts, 82: 99269, 1975.

*Primary Examiner*—Donald G. Daus
*Attorney, Agent, or Firm*—Darby & Darby

[57] ABSTRACT

An anthrapyridone compound of the following formula (I) and which is useful for coloring resins:

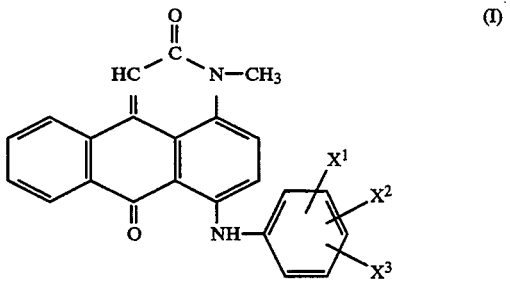

wherein $X^1$ is hydrogen, $-NHCOR^1$, $-CONR^2R^3$, $-COR^4$, $-SO_2R^5$ or $-SO_2NR^6R^7$, in which $R^1$ and $R^4$ are each $C_{1-4}$ alkyl, $R^2$ and $R^3$ are each hydrogen or $C_{1-4}$ alkyl, $R^5$ is $C_{1-4}$ alkyl or hydroxyethyl, $R^6$ and $R^7$ are each hydrogen or $C_{1-4}$ alkyl, $X^2$ is hydrogen or imidomethyl of the formula (II):

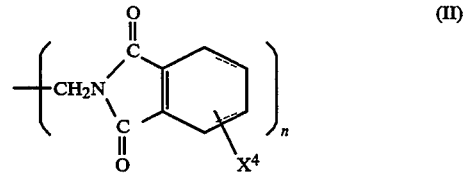

wherein n is a number of 1 to 2, $X^4$ is hydrogen or carboxylic acid $C_{1-4}$ alkyl-ester, $X^3$ is hydrogen, halogen, hydroxyl, $C_{1-4}$ alkyl or $C_{1-4}$ alkoxyl, with the proviso that $X^1$ is $-NHCOR^1$, $-CONR^2R^3$, $-COR^4$, (Abstract continued on next page.)

—$SO_2R^5$ or —$SO_2NR^6R^7$ when $X^2$ is hydrogen, $X^2$ is the imidomethyl of the formula (II) when $X^1$ is the hydrogen, is provided, which is prepared by allowing an α-haloanthraquinone compound with an acylated primary aromatic amine compound in a nonaqueous medium in the presence of metallic copper or a copper compound.

4 Claims, No Drawings

ANTHRAPYRIDONE COMPOUNDS, THEIR PRODUCTION PROCESS AND THEIR USE

This is a continuation application of Ser. No. 07/773,129, filed Oct. 8, 1991 now abandoned, which is a continuation application of Ser. No. 07/430,663, filed Nov. 11, 1989 now abandoned, which is a continuation application of Ser. No. 07/126,596, filed Nov. 30, 1987, now U.S. Pat. No. 4,902,798.

The present invention relates to a new anthrapyridone compound, a process for producing the same and a coloring agent for resins containing the same. The present invention also relates to a new process for producing an anthraquinone compound including new anthrapyridone compound.

Anthrapyridone compounds represented by the formulas (A), (B) and (C) are known:

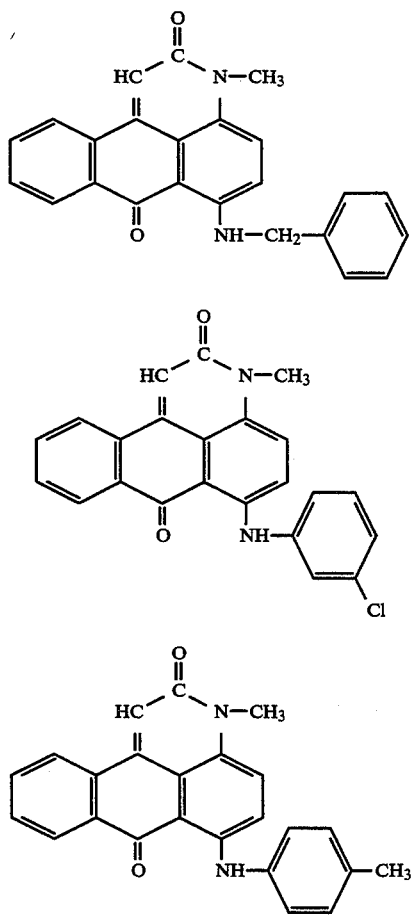

They are used as coloring agents particularly for synthetic resins.

Although these coloring agents are excellent in heat resistance, molded articles made from resins which are colored by these coloring agents are poor in fastness such as light resistance, bleeding resistance and extraction resistance.

Anthraquinone compounds are extensively used particularly for disperse dyes, reactive dyes, acid dyes, cationic dyes, oil colors and the like. Of these compounds, those produced through Ullmann reaction and used as dyestuffs are important from an industrial point of view, which include, for example,

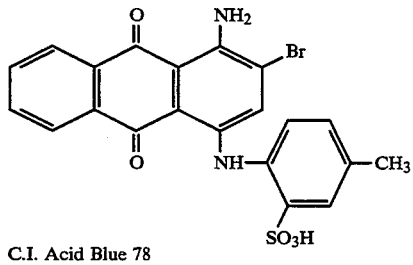

C.I. Acid Blue 78

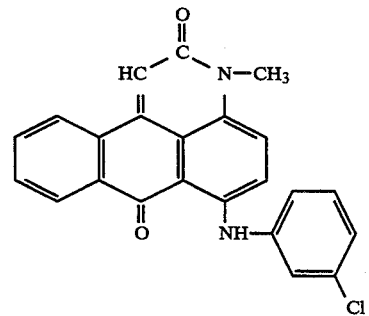

C.I. Solvent Red 151
the same as B above

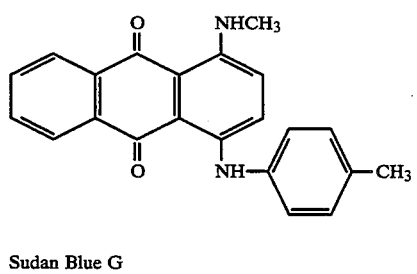

Sudan Blue G

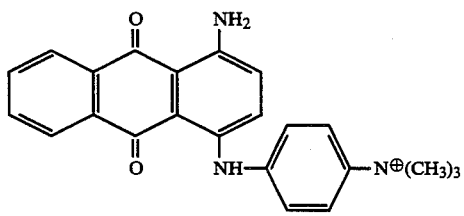

C.I. Basic Blue 47

These anthraquinone compounds are produced by subjecting the corresponding α-haloanthraquinone compounds to condensation reaction with aromatic primary amine compounds in the absence of a solvent or in an aqueous or nonaqueous medium in the presence of metallic copper or a copper compound. However, this reaction hardly gives the desired compounds of high purity in high yield, since the reaction rate is small and a large amount of decomposition products of both the α-haloanthraquinone compounds and the aromatic primary amine compounds are produced.

The present inventors have found that the specific anthrapyridone compound provides a coloring agent excellent in heat resistance and colored molded articles superior in light resistance, bleeding resistance, extraction resistance and the like, are obtained, when the compound is used as a coloring agent.

It is a primary object of the present invention to provide a coloring agent having excellent performances.

It is another object of the present invention to provide a process for producing anthraquinone compounds of high purity in high yield, substantially in quantitatively, by condensing an α-halo anthraquinone compound with an acylated compound of aromatic primary amine.

According to the present invention, an anthrapyridone compound represented by the formula (I):

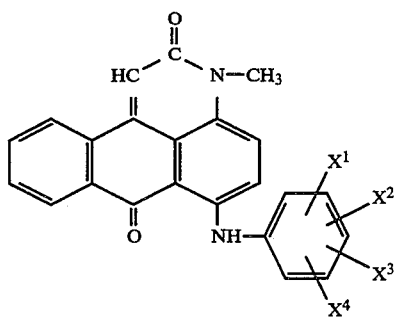

wherein $X^1$ is hydrogen, —NHCOR$^1$, —CONR$^2$R$^3$, —COR$^4$, —SO$_2$R$^5$ or —SO$_2$NR$^6$R$^7$, in which R$^1$ and R$^4$ are each C$_{1-4}$ alkyl, R$^2$ and R$^3$ are each hydrogen or C$_{1-4}$ alkyl, R$^5$ is C$_{1-4}$ alkyl or hydroxyethyl, R$^6$ and R$^7$ are each hydrogen or C$_{1-4}$ alkyl; X$^2$ and X$^4$ are hydrogen or imidomethyl of the formula (II):

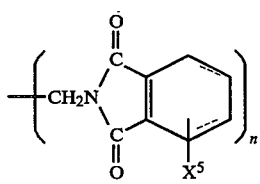

Wherein n is a number of 1 to 2; X$^5$ is hydrogen or carboxylic acid C$_{1-4}$ alkyl-ester; X$^3$ is hydrogen, halogen, hydroxyl, C$_{1-4}$ alkyl or C$_{1-4}$ alkoxyl, with the proviso that X$^1$ is —NHCOR$^1$, —CONR$^2$R$^3$, —COR$^4$, —SO$_2$R$^5$ or —SO$_2$NR$^6$R$^7$ when X$^2$ is hydrogen, X$^2$ is the imidomethyl of the formula (II) when X$^1$ is hydrogen; a process for producing the compound of the formula (I), and a coloring agent for resin containing the same are provided.

Among the anthrapyridone compound of the present invention, particularly preferred are those represented by the formulas (XI) and (XII):

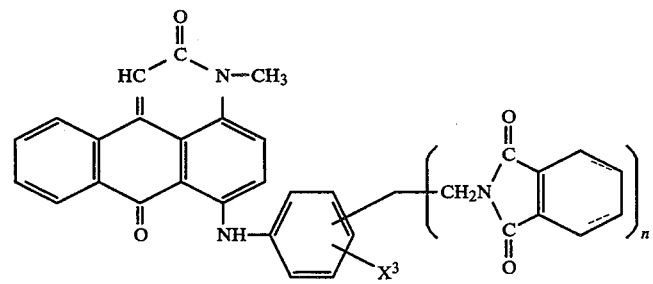

wherein X$^3$ is chloro or methyl, n is 1 to 2,

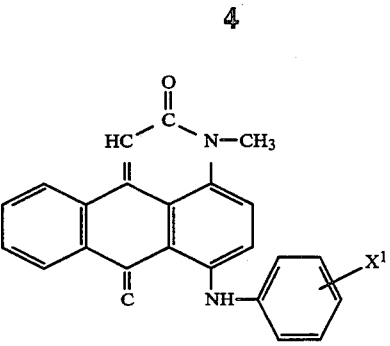

wherein X$^1$ is SO$_2$NR$^6$R$^7$, in which R$^6$ and R$^7$ are each methyl or ethyl.

An anthrapyridone compound represented by the formula (I):

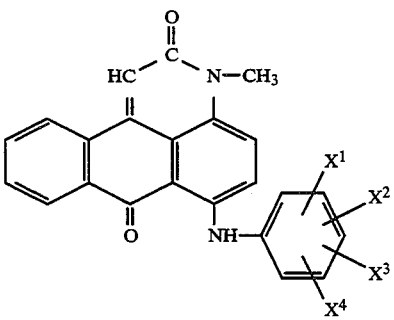

wherein $X^1$ is hydrogen, —NHCOR$^1$, —CONR$^2$R$^3$, —COR$^4$, —SO$_2$R$^5$ or —SO$_2$NR$^6$R$^7$, in which R$^1$ and R$^4$ are each C$_{1-4}$ alkyl, R$^2$ and R$^3$ are each hydrogen or C$_{1-4}$ alkyl, R$^5$ is C$_{1-4}$ alkyl or hydroxyethyl, R$^6$ and R$^7$ are each hydrogen or C$_{1-4}$ alkyl, X$^2$ and X$^4$ are hydrogen or imidomethyl of the formula (II):

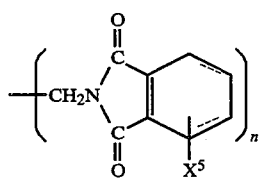

wherein n is a number of 1 to 2, X$^5$ is hydrogen or carboxylic acid C$_{1-4}$ alkyl-ester, X$^3$ is hydrogen, halogen, hydroxyl, C$_{1-4}$ alkyl or C$_{1-4}$ alkoxyl, with the proviso that X$^1$ is —NHCOR$^1$, —CONR$^2$R$^3$, —COR$^4$, —SO$_2$R$^5$ or —SO$_2$NR$^6$R$^7$ when X$^2$ is hydrogen, X$^2$ is the imidomethyl of the formula (II) when X$^1$ is hydrogen, is prepared by allowing an α-haloanthrapyridone compound represented by the formula (III):

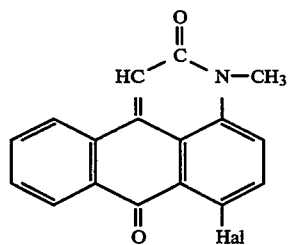
(III)

wherein Hal is halogen, to react with an amine compound represented by the formula (IV):

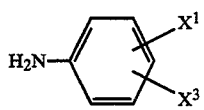
(IV)

wherein $X^1$ and $X^3$ are as defined above, followed by the reaction with an N-methylol compound represented by the formula (V):

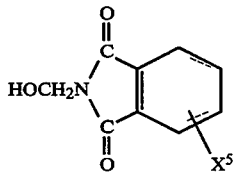
(V)

wherein $X^5$ is also defined above, the reaction with the N-methylol compound (V) being carried out necessarily when $X^1$ is hydrogen, and optionally when $X^1$ are —NHCOR$^1$, —CONR$^2$R$^3$, —COR$^4$, —SO$_2$R$^5$ or —SO$_2$NR$^6$R$^7$ in which R$^1$, R$^2$, R$^3$, R$^4$, R$^5$, R$^6$ and R$^7$ are as defined above, in an organic solvent in the presence of a metallic copper or a copper compound at a temperature of 100°–170° C. An acid-binding agent may be added, if necessary.

Alternatively, the anthrapyridone compound (I) is obtained by allowing the α-haloanthrapyridone compound represented by the formula (III):

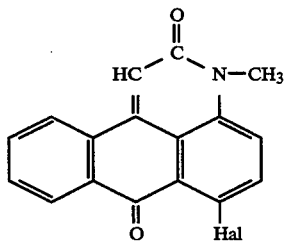
(III)

wherein Hal is halogen, to react with an amine compound represented by the formula (VI):

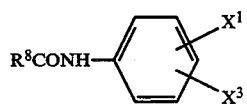
(VI)

wherein $X^1$ and $X^3$ are as defined above, R$^8$ is C$_{1-4}$ alkyl, in organic solvent in the presence of metallic copper or a copper compound, to obtain a compound represented by the formula (VII):

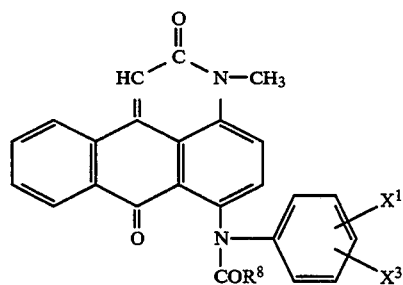
(VII)

wherein R$^8$, $X^1$ and $X^3$ are as defined above and then subjecting the compound (VII) to hydrolysis, followed by the reaction with an N-methylol compound represented by the formul (V):

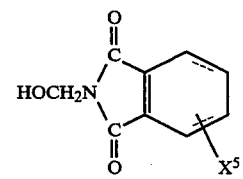
(V)

wherein $X^5$ is as defined above, the reaction with the N-methylol compound (V) being carried out necessarily when $X^1$ is hydrogen, and optionally when $X^1$ are —NHCOR$^1$, —CONR$^2$R$^3$, —COR$^4$, —SO$_2$R$^5$ or —SO$_2$NR$^6$R$^7$, in which R$^1$, R$^2$, R$^3$, R$^4$, R$^5$, R$^6$ and R$^7$ are as defined above.

A copper compound to be employed is, for instance, copper halide such as cuprous chloride and cupric chloride, copper oxide, copper sulfate and copper acetate. It may be used alone or in a mixture thereof.

An organic solvent is, for example, nitro benzene, halobenzene such as monochlorobenzene and o-dichlorobenzene, alkylbenzene such as toluene and xylene, and polar solvent such as dimethylformamide, sulfolane and dimethylsulfoxide. It may be alone or in a mixture thereof.

An acid-binding agent includes alkali metal salt such as sodium carbonate, potassium carbonate, sodium hydrogencarbonate and potassium hydrogencarbonate and sodium acetate.

The reaction of N-methylol compound (V) with hydrolysis product of compound (VII) is usually carried out, for instance, aqueous sulfuric acid solution, at a temperature of 0–50° C. for 1–10 hours or somewhat longer.

This invention further provides another process wherein anthraquinone compound represented by the formula (VIII):

D—NH—Y (VIII)

wherein D is anthrapyridone or anthraquinone residue and Y is aromatic primary amine residue, is prepared by subjecting a compound represented by the formula (IX):

R—CONH—Y (IX)

wherein R is C$_{1-4}$ straight or branched lower alkyl and Y is as defined above to condensation with α-haloanthraquinone and then hydrolysing.

The condensation reaction for preparing the compound (VIII) above is carried out in a non-aqueous medium in the presence of, for example, metallic copper or a copper compound at a temperature of 100°170° C., thereby a compound represented by the formula (X):

of high purity is prepared in high yield. An acid-binding agent may be added, if necessary. Hydrolysis of the compound (X) is carried out by any of known manner and gives highly pure compound (VIII) in high yield.

The α-haloanthraquinone compound to be used in this reaction includes N-methyl-4-bromo-1, 9-anthrapyridone, 1-methylamino-4-bromoanthraquinone, 1-amino-2,4-dibromoanthraquinone, 1-chloroanthraquinone and 1,5-dichloroanthraquinone.

The compound (IX) is an acylation product of aromatic primary amine. The aromatic ring or benzene ring thereof may further be substituted by any of halogen, lower alkyl, lower alkoxyl, alkoxyalkyl, aralkyl, cyano, hydroxyl, carboxyl, hydroxyethylsulfonyl, nitro, sulfonyl, amino, alkylcarbonyl, N,N-dialkylsulfonylamino, alkylsulfonyl group and the like.

Copper compound usable in the reaction for preparing the compound (VIII) is copper halides such as cuprous chloride, cupric chloride and the like, copper oxide, copper sulfate and copper acetate. These compounds are used alone or in a mixture thereof.

Examples of the nonaqueous medium are halobenzene such as monochlorobenzene, o-dichlorobenzene and the like, nitrobenzene, alkylbenzenes such as toluene, xylene and the like, polar solvents such as sulfolane. These medium are used alone or in a mixture thereof.

The acid-binding agent are alkali metal salts such as sodium carbonate, potassium carbonate, sodium hydrogencarbonate, potassium hydrogencarbonate and the like and sodium acetate.

The condensation reaction between the α-haloanthraquinone compound and the acylation product of aromatic primary amine compound of the formula (VII) proceeds quantitatively and may be carried out within a wider range of reaction temperature than the conventional condensation with aromatic primary amines, since the compound of the formula (IX) is greatly stable during the reaction and an amount of decomposition products is very small. No large amount of aromatic primary amine as in the conventional method is needed.

Hydrolysis of the compound (X) is carried out in the presence of acid or alkali, preferably acid.

The anthrapyridone compounds of the formula (I) are useful as a coloring agent for resins.

Examples of the resin to be colored are thermoplastic resins such as polystyrene, polymethylmethacrylate, polyvinyl chloride, acrylonitrile-butadiene-styrene copolymer (ABS resin), acrylonitrilestyrene copolymer (AS resin), polycarbonate, polyphenyleneoxide, polypropylene, polyethylene, polyacrylonitrile, polyamide, polyacetal, polyethyleneterephthalate, polybutyleneterephthalate and the like and thermosetting resins such as phenol resin, urea resin, melamine resin, unsaturated polyester resin, epoxy resin, diallylphthalate resin and the like.

Colored products are obtained by blending the coloring agent and resins in a suitable manner, and the resulting blend is subjected to molding such as injection molding, extrusion molding and spinning. For instance, pellets or powders of the resin are mixed with the pulverized coloring agent in a suitable mixer, if desired together with conventional additives, and then the mixture is treated in a kneader, roller mill, Banbury mixer, extruder or the like until the coloring agent is dissolved or dispersed in the resin. If desired, the resulting colored resin is subjected to molding such as compression, injection, extrusion or blow, thereby obtaining the desired colored molded articles. Alternatively, the coloring agent is mixed with a monomer containing a polymerization catalyst, followed by polymerization to obtain a colored thermoplastic or thermosetting resin. The resulting colored resin, if desired, is able to mold in the manner described above.

An amount of the coloring agent to be added is not critical but 0.01 to 5% by weight, preferably 0.01 to 1% by weight, based on the weight of the resin, from an economical point of view.

Other dyes and pigments usually used for coloring resin may be additionally used. For example, opaque colored articles are obtained by adding 0.1-1% by weight of titanium oxide.

The present invention is explained in more detail with reference to the following Examples, which are only illustrative, but not limitative. In Examples, parts are by weight.

EXAMPLE 1

A mixture of N-methyl-4-bromo-1,9-anthrapyridone (3.4 parts) of the following formula:

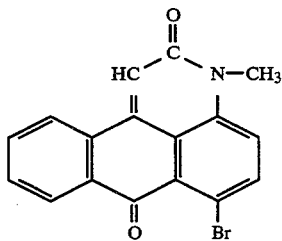

and an amine (15 parts) of the following formula:

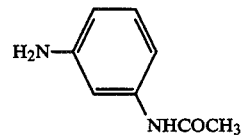

was heated at 130° to 140° C. for 20 hours in o-dichlorobenzene in the presence of copper acetate (0.1 part) and sodium acetate (2.0 parts). Thereafter, the precipitate produced was filtrated, washed with methanol and dried to obtain a cake (2.8 parts, yield 68%) of anthrapyridone compound of the following formula.

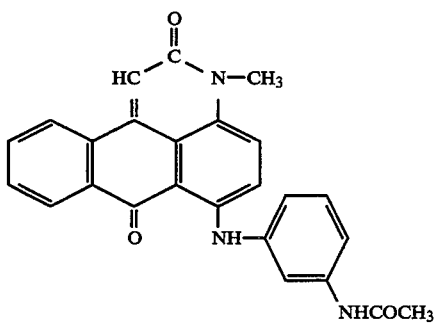

This compound showed a single red spot when thin-layer-chromatographed, and FD-Mass thereof showed a peak at 409 and had its theoretical molecular weight. The maximum absorption wave length thereof (λ max) was found to be 535 nm (in chloroform).

The anthrapyridone compound obtained (0.2 part) was blended with ABS resin ("Kralastic MH natural" prepared by Sumitomo-Naugatuch Co., Ltd., 100 parts), and the resulting blend was subjected to coloring at 205° C. using an extruder, whereby colored pellets were obtained.

The pellets obtained were molded at the cycle of 230° C.×1 minute using an injection molding machine to obtain an opaque plate-like molded article of a bluish red color. The molded article was found to be superior in bleeding resistance as well as extraction resistance and light resistance. Even when the injection molding was carried out at the cycle of 270° C.×3 minutes, a shade of the resulting plate-like molded articles was slightly different from that obtained above. This demonstrates a superior heat resistance of the compound.

EXAMPLE 2

A mixture of the same N-methyl-4-bromo-1,9-anthrapyridone (3.4 parts) as in Example 1 and an acetanilide compound (4.8 parts) of the following formula:

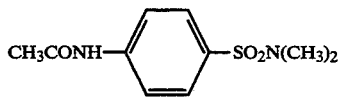

was heated at 145° C. to 150° C. for 18 hours in o-dichlorobenzene in the presence of copper acetate (0.1 part) and sodium hydrogencarbonate (2.1 parts). Thereafter, the precipitate produced was filtrated, washed with methanol and dried to obtain a yellow cake (3.7 parts). The cake was heated in 5% aqueous sodium hydroxide solution at 130° to 135° C. for 20 hours, thereafter filtered, washed with water and dried to obtain an anthrapyridone compound (3.2 parts, yield 70%) of the following formula.

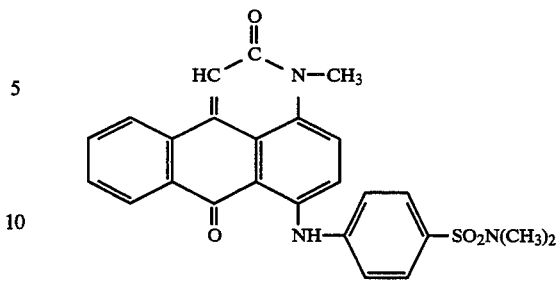

This compound showed a single red spot, when thin-layer-chromatographed, and FD Mass thereof showed a peak at 459 and had its theoretical molecular weight. The λ max thereof was found to be 534 nm (in chloroform).

The compound obtained (0.2 part) was subjected to molding in the same manner as in Example 1, thereby obtaining a plate-like molded article of a yellowish red color. The molded article obtained was found to be superior in bleeding resistance, extraction resistance and light resistance. In a manner similar to that of Example 1, the coloring agent was found to have superior heat resistance.

EXAMPLE 3

Example 1 was repeated, provided that an amine of the following formula:

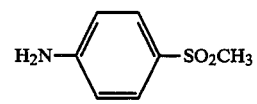

was used in place of the amine of the formula:

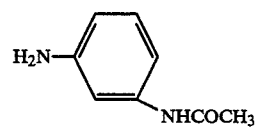

whereby an anthrapyridone compound of the following formula:

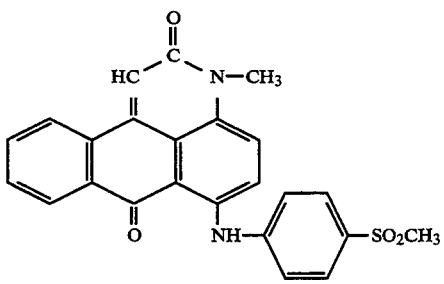

was obtained.

This compound showed a single red spot, when thin-layer-chromatographed, and FD Mass thereof showed a peak at 430 and had its theoretical molecular weight. The λ max thereof was found to be 533 nm (in chloroform).

The compound obtained (0.2 part) was subjected to molding in the same manner as in Example 1, thereby obtaining a plate-like molded article of a yellowish red color excellent in bleeding, extraction and light resistances. Like in Example 1, the compound was found to be superior in heat resistance.

EXAMPLE 4

Example 1 was repeated, provided that an amine of the following formula:

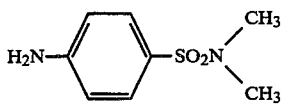

was used in place of that used in Example 1, whereby there was obtained an anthrapyridone compound of the following formula.

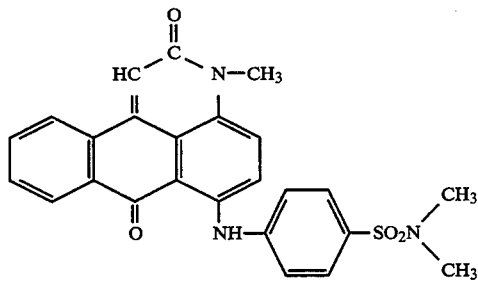

The compound obtained showed a single red spot, when thin-layer-chromatographed, and FD Mass thereof showed a peak at 459 and had its theoretical molecular weight. The λ max thereof was found to be 534 nm (in chloroform).

In the same manner as in Example 1, the compound obtained (0.2 part) was subjected to molding, thereby obtaining a plate-like molded article of a yellowish red color excellent in bleeding, extraction and light resistances. Like in Example 1, the compound was superior in heat resistance.

COMPARATIVE EXAMPLES 1, 2 and 3

Comparative examples were carried out, using known anthrapyridone compounds of the aforesaid formulas (A), (B) and (C).

Comparative Example 1 ... Known compound of the formula (A) was used.
Comparative Example 2 ... Known compound of the formula (B) was used.
Comparative Example 3 ... Known compound of the formula (C) was used.

Each molding was carried out in the same manner as in Example 1 using the known compounds (0.2 part). The quality of the molded articles obtained was as shown in Table 1, in which that of molded articles obtained in accordance with the present invention was also shown for the comparison purpose.

Table 1 demonstrates that the anthrapyridone compounds in accordance with the present invention are superior in their heat resistance and the colored molded articles are also superior in their light, bleeding and extraction resistances, as compared with the known compounds.

TABLE 1

| | Bleeding resistance | Extraction resistance | Light resistance | Heat resistance |
|---|---|---|---|---|
| Example 1 | 4–5 | ○ | 7–8 | 4–5 |
| Example 2 | 4–5 | ○ | 7–8 | 4–5 |
| Example 3 | 4–5 | ○ | 7–8 | 4–5 |
| Example 4 | 4–5 | ○ | 7–8 | 4–5 |
| Comparative Example 1 | 3–4 | X (n-heptane) | 4 | 3–4 |
| Comparative Example 2 | 3–4 | X (n-heptane) | 7 | 4–5 |
| Comparative Example 3 | 1–2 | ○ | 5 | 4–5 |

Notes: Bleeding resistance

A colored ABS plate and a soft PVC plate containing 1.0% of $TiO_2$ are placed one upon another, and treated at 80° C. for 2 hours under a load of 100 g/cm². The degree of coloring of the soft PVC plate is evaluated by means of a grey scale for assessing a stainning according to JIS-L-0805. The larger the number is, the higher fastness is.

Extraction resistance

A test method for coloring material is applied which is established by the Japan Hygienic Olefin and Styrene Plastics Association.
○ ... available for use
X ... unavailable for use Light resistance According to JIS-L-0842, an accelerated test is carried out using Fade-O-meter, and the exposed sample was judged in comparison with a blue scale (JIS-L-0841) simultaneously exposed. The larger the number is, the higher fastness is.

Heat resistance

The degree of change in color of the molding articles obtained by injection molding of the colored ABS pellets at the cycle of 270° C.×3 minutes on the basis of those obtained at the cycle of 230° C.×1 minute is judged by means of a scale for assessing change in color according to JIS-L-0804. The larger the number is, the higher fastness is.

EXAMPLE 5

In a manner similar to that of Example 1, an anthrapyridone compound of the following formula:

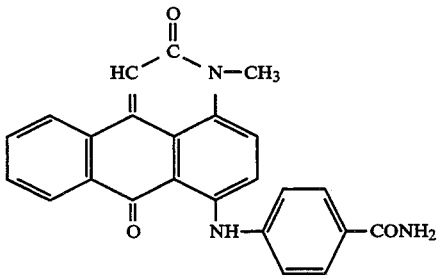

was obtained.

This compound showed a single red spot, when thin-layer-chromatographed, and FD Mass thereof showed a peak at 394 and had its theoretical molecular weight. The λ max was found to be 531 nm (in chloroform).

The compound obtained (0.2 part) was blended with polystyrene resin ("Esbrite 4–62" prepared by Sumitomo Chemical Co., Ltd., 100 parts), and the blend was subjected to coloring by means of an extruder at 205° C. thereby obtaining colored pellets.

The pellets obtained were subjected to molding by means of an injection molding machine at the cycle of 220° C.×1 minute. The molded articles obtained of bluish red color was found to be superior in bleeding, extraction and light resistances.

EXAMPLE 6

In a manner similar to that of Example 1, an anthrapyridone compound of the following formula:

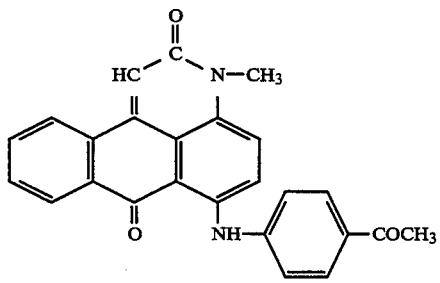

was obtained.

The λ max of the compound was found to be 526 nm (in chloroform).

The compound obtained (0.1 part) was blended with polyethylene resin (100 parts), and the blend was subjected to coloring at 220° C. using an extruder.

In the same manner as in Example 1, the pellets were molded to obtain a plate-like molded article of bluish red color excellent in bleeding and light resistances.

EXAMPLES 7 to 14

Molding was carried out in the same manner as in Example 1 using as a coloring agent each anthrapyridone compound as shown in Table 2. The molded articles obtained were superior in bleeding, extraction and light resistances. Like in Example 1, the coloring agents were superior in heat resistance.

The anthrapyridone compounds used are those having the following formula.

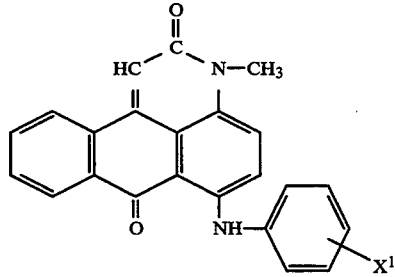
(XIII)

TABLE 2

| Example No. | Substitution position of $X^1$ | $X^1$ | Color of molded articles | λ max (in chloroform) nm |
|---|---|---|---|---|
| 7 | o- | —NHCOCH$_3$ | Bluish red | 532 |
| 8 | p- | —NHCOC$_2$H$_5$ | Bluish red | 534 |
| 9 | m- | —SO$_2$CH$_3$ | Yellowish red | 534 |
| 10 | p- | —SO$_2$C$_2$H$_5$ | Yellowish red | 534 |
| 11 | p- | —SO$_2$N(C$_2$H$_5$)$_2$ | Red | 533 |
| 12 | m- | —COCH$_3$ | Bluish red | 528 |
| 13 | m- | —CONH$_2$ | Bluish red | 536 |
| 14 | p- | —SO$_2$C$_2$H$_4$OH | Yellowish red | 534 |

EXAMPLE 15

A mixture of an anthrapyridone compound (3.9 parts) represented by the following formula:

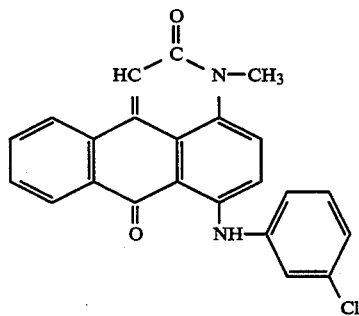

and an N-methylol compound (5.3 parts) represented by the following formula:

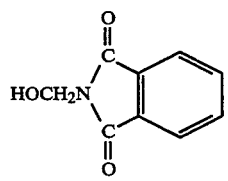

was stirred at 25° to 30° C. for 7 hours in 90% sulfuric acid (50 g), and thereafter the reaction mixture was discharged in water (300 ml). The precipitate was filtrated, washed with water and then dried to obtain a cake (6.7 parts) of an anthrapyridone compound represented by the following formula.

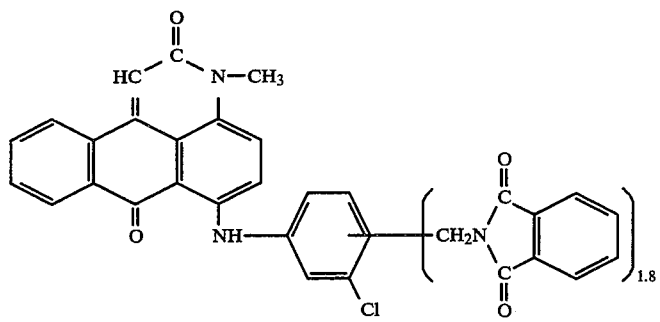

The λ max and melting point of the compound were found to be 522 nm (in chloroform) and 212° to 217° C., respectively.

The anthrapyridone compound obtained (0.2 part) was blended with ABS resin (100 parts), and the blend was subjected to coloring at 205° C. using an extruder, thereby obtaining colored pellets.

The colored pellets were molded by means of an injection molding machine at the cycle of 230° C.×1 minute to obtain an opaque plate-like molded article of yellowish red color superior in bleeding, extraction and light resistances. Even when the molding was carried out at the cycle of 270° C.×3 minutes, difference in color of the resulting plate-like molded article was little. This demonstrates a superior heat resistance of the anthrapyridone compound.

EXAMPLE 16

Example 15 was repeated, provided that an N-methylol compound of the following formula:

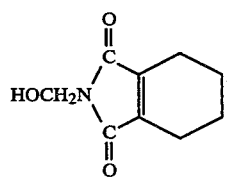

was used in place of that used in Example 15, thereby obtaining a yellowish red anthrapyridone compound of the following formula.

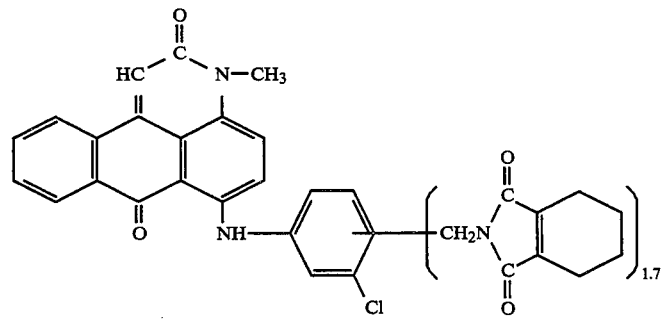

λ max 522 nm (in chloroform); m.p. 147° to 152° C.

EXAMPLE 17

Example 15 was repeated, provided that an anthrapyridone compound of the following formula;

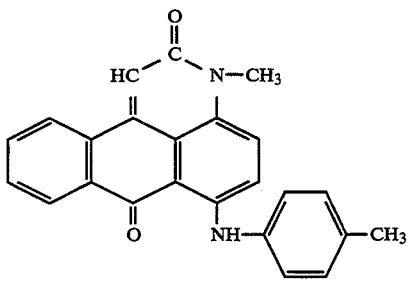

was used in place of that used in Example 15, thereby obtaining an anthrapyridone compound of the following formula.

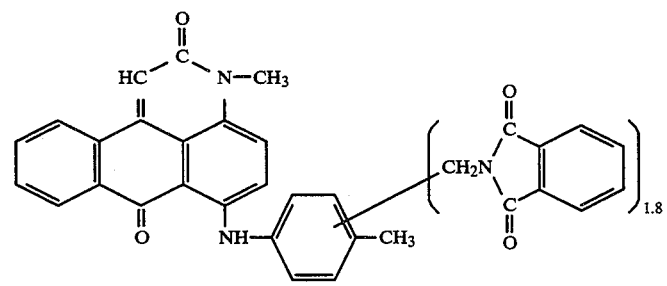

λ max 525 nm (in chloroform); m.p. 192° to 197.5° C.

Molding was carried out in the same manner as in Example 15 using the compound obtained (0.2 part) to obtain a plate-like molded article of a somewhat bluish color superior in bleeding, extraction and light resistances. Like in Example 15, the compound was found to be superior in heat resistance.

The results of Examples 15 to 17 are as shown in Table 3. Table 3 demonstrates that the anthrapyridone compounds of the present invention are superior in heat resistance and give colored resin molded articles superior in light, bleeding and extraction resistances.

TABLE 3

| | Bleeding resistance | Extraction resistance | Light resistance | Heat resistance |
|---|---|---|---|---|
| Example 15 | 4–5 | ◯ | 7–8 | 4–5 |
| Example 16 | 4–5 | ◯ | 7–8 | 4–5 |
| Example 17 | 4–5 | ◯ | 7–8 | 4–5 |

Test methods for the above respective resistances are the same as those described in Table 1.

EXAMPLE 18

In a manner similar to that of Example 15, an anthrapyridone compound of the following formula:

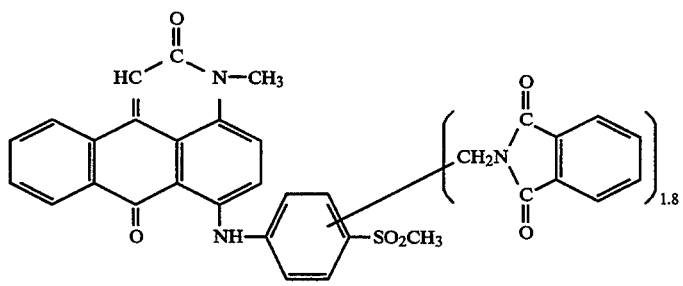

was obtained. λ max 520 nm (in chloroform).

The compound obtained (0.2 part) was blended with polystyrene resin (100 parts), and the blend was subjected to coloring at 205° C. using an extruder, thereby obtaining colored pellets.

The colored pellets were molded using an injection molding machine at the cycle of 220° C.×1 minute to obtain a molded article of a yellowish red superior in bleeding, extraction and light resistances.

EXAMPLE 19

In a manner similar to that of Example 15 an anthrapyridone compound of the following formula:

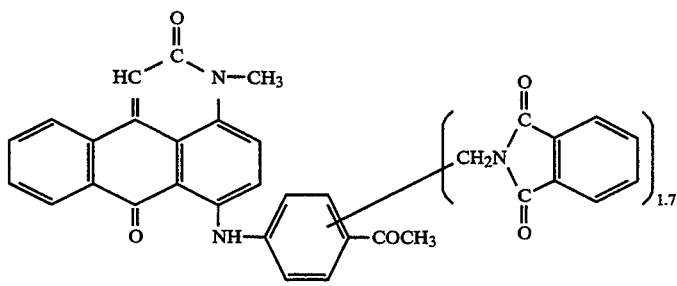

was obtained. λ max 519 nm (in chloroform).

The compound obtained (0.1 part) was blended with polyethylene resin ("Sumikasen hard 2603B" prepared by Sumitomo Chemical Co., Ltd., 100 parts), and the blend was subjected to coloring at 220° C. using an extruder, thereby obtaining colored pellets.

The colored pellets were molded in a manner similar to that of Example 15 to obtain a plate-like molded article of yellowish red superior in bleeding and light resistances.

EXAMPLES 20 to 23

Molding each was carried out in a manner similar to that of Example 15 using the anthrapyridone compounds as shown in Table 4. The molded articles were found to be superior in bleeding, extraction and light resistances. Like in Example 15, the molded articles were superior in heat resistance.

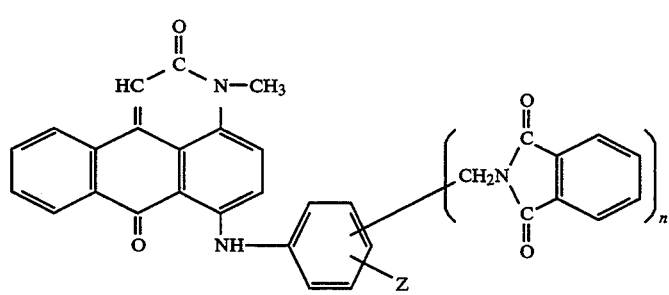

TABLE 4

| Example No. | Substitution position of Z | Z | n | Color of molded articles | λ max (in chloroform) nm |
| --- | --- | --- | --- | --- | --- |
| 20 | m- | —Cl | 1.2 | Yellowish red | 522 |
| 21 | p- | —SO$_2$N(CH$_3$)$_2$ | 1.7 | Yellowish red | 520 |
| 22 | m- | —CONH$_2$ | 1.8 | Bluish red | 527 |
| 23 | m- | —NHCOCH$_3$ | 1.8 | Bluish red | 528 |

EXAMPLE 24

In a reactor were charged o-dichlorobenzene (70 parts), N-methyl-4-bromo-1,9-anthrapyridone (17 parts), m-chloroacetanilide (10.2 parts), sodium hydrogencarbonate (10.5 parts) and cuprous chloride (0.5 part), and the mixture was kept at 140° to 145° C. under a nitrogen gas atmosphere for 11 hours, during which water was separated from the generated azeotropic mixture using a separater. After the reaction was over, the o-dichlorobenzene was recovered by steam distillation, and the residue was cooled. The precipitate produced was filtrated, washed with water (200 parts) and dried at 80° C. to 90° C. to obtain a dry cake (20.2 parts). Yield based on N-methyl-4-bromo-1,9-anthrapyridone charged was 98%.

The compound obtained showed a single spot, when thin-layer-chromatographed. Raw material was nearly trace, and LC analysis value was 99.3%.

The whole of the dry cake obtained was put in 73% sulfuric acid (240 parts) prepared in advance, and the mixture was kept at 50° to 55° C. for 1 hour. The reaction mixture was diluted with water to make the concentration of the sulfuric acid 50%, and the precipitate produced was filtrated, washed with water and then dried at 80° to 90° C. to obtain N-methyl-4-(3'-chloroanilino)-1,9-anthrapyridone (18.8 parts). Yield based on N-methyl-4-bromo-1,9-anthrapyridone charged was 97%.

This compound showed a single spot, when thin-layer-chromatographed. LC analysis value was 99.6%. ABS resin colored with this compound gave favorable results.

EXAMPLE 25 to 28

The condensation reaction and hydrolysis were carried out in a manner similar to that of Example 24, except that reaction conditions were changed to those as shown in Table 5. Results are as shown in Table 5.

TABLE 5

| Example No. | 25 | 26 | 27 | 28 |
| --- | --- | --- | --- | --- |
| Solvent | o-Dichlorobenzene | Nitrobenzene | o-Dichlorobenzene | o-Dichlorobenzene |
| Reaction temperature (°C.) | 150 to 155 | 140 to 145 | 140 to 145 | 140 to 145 |
| Reaction time (hours) | 8 | 11 | 15 | 11 |
| Acid-binding agent | Sodium hydrogencarbonate 10.5 parts | Sodium hydrogencarbonate 10.5 parts | Sodium carbonate 6.6 parts | Potassium hydrogencarbonate 12.5 parts |
| Catalyst | Cuprous chloride 0.5 part | Cuprous chloride 0.5 part | Copper acetate 0.5 part | Metallic copper 0.5 part |
| Yield of N-methyl-4-(3'-chloroanilino)-1,9-anthrapyridone (%) | 96.9 | 96.5 | 96.5 | 97.0 |

Comparative Example 4

In a reactor were charged m-chloroaniline (32 parts), N-methyl-4-bromo-1,9-anthrapyridone (17 parts), sodium acetate (10.3 parts) and copper acetate (0.5 part), and the mixture was kept at 14020 to 145° C. for 8 hours under nitrogen gas astomosphere. Thereafter, the reaction mixture was diluted with o-dichlorobenzene and cooled. The precipitate produced was filtrated, washed with methanol (500 parts) and then water (200 parts), and dried at 80° to 90° C. to obtain N-methyl-4-(3'-chloroanilino)-1,9-anthrapyridone (yield 75%).

EXAMPLES 29 to 31

Example 24 was repeated, provided that the compounds as shown in Table 6 were used in place of m-chloroacetanilide, thereby obtaining the corresponding anthrapyridone compounds of high purity in high yields.

Comparative Examples 5 to 7

Comparative example 4 was repeated using the compounds as shown in Table 6 in place of m-chloroaniline to obtain the corresponding anthrapyridone compounds.

Comparison of Examples 29 to 31 with Comparative Examples 5 to 7 shows that yield of the present process is superior to that of each Comparative Example.

TABLE 6

| Example No. | Acylated aromatic primary amine | Amount used (parts) | Yield of anthrapyridone (%) |
| --- | --- | --- | --- |
| 29 | 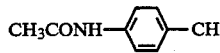 | 8.8 | 94 |
| 30 | 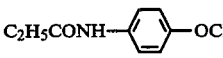 | 10.7 | 94.5 |
| 31 | 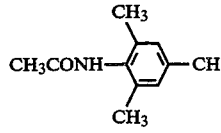 | 10.3 | 94 |

| Comp. example No. | Aromatic primary amine | Amount used (parts) | Yield of anthrapyridone (%) |
| --- | --- | --- | --- |
| 5 |  | 26.8 | 77 |
| 6 | 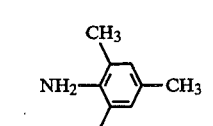 | 30.8 | 74 |
| 7 | 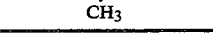 | 33.8 | 54 |

EXAMPLE 32

Example 24 was repeated, provided that N-propionyl-4-sulfomethylaniline (17.0 parts) was used in place of m-chloroacetanilide. After the reaction was over, the reaction mixture was cooled, and the precipitate filtrated was washed with methanol (500 parts) and then water (200 parts) and dried at 80° to 90° C. to obtain a dry cake (18.6 parts).

The dry cake was subjected to hydrolysis with 73% sulfuric acid in a manner similar to that of Example 24, thereby obtaining N-methyl-4-(4'-sulfomethylanilino)-1,9-anthrapyridone (16.8 parts, yield 78% based on N-methyl-4-bromo-1,9-anthrapyridone charged).

This compound showed a single spot when thin-layer-chromatographed.

Comparative Example 8

In a reactor were charged p-sulfomethylaniline (42.8 parts), o-dichlorobenzene (120 parts), N-methyl-4-bromo-1,9-anthrapyridone (17 parts), sodium acetate (10.3 parts) and copper acetate (0.5 part), and the mixture was kept at 140° to 145° C. for 20 hours under a nitrogen gas atmosphere. Thereafter, the reaction mixture was cooled, and the precipitate was filtrated, washed with methanol (500 parts) and then water (200 parts), and dried at 80° to 90° C. to obtain N-methyl-4-(4'-sulfomethylanilino)-1,9-anthrapyridone (yield 38%).

EXAMPLES 33 to 35

Example 32 was repeated, provided that the compounds as shown in Table 7 were used in place of N-propionyl-4-sulfomethylaniline, thereby obtaining the corresponding anthrapyridone compound.

Comparative Examples 9 to 11

Comparative Example 8 was repeated using the compounds as shown in Table 7 in place of p-sulfomethylaniline to obtain the corresponding anthrapyridone compounds.

Comparison of Examples 33 to 35 with comparative Examples 9 to 11, respectively, shows that. yield of the present process is superior to that each of Comparative Example.

TABLE 7

| | Compound used | Amount (parts) | Yield of anthrapyridone (%) |
|---|---|---|---|
| Example No. | | | |
| 33 | CH$_3$CONH—⟨⟩—SO$_2$N(CH$_3$)$_2$ | 19.2 | 70 |
| 34 | CH$_3$CONH—⟨⟩—COCH$_3$ | 13.3 | 75 |
| 35 | CH$_3$CONH—⟨⟩—OH | 9.1 | 82 |
| Comp. example No. | | | |
| 9 | NH$_2$—⟨⟩—SO$_2$N(CH$_3$)$_2$ | 50 | 35 |
| 10 | NH$_2$—⟨⟩—COCH$_3$ | 33.8 | 40 |
| 11 | NH$_2$—⟨⟩—OH | 27.3 | 56.5 |

EXAMPLE 36

In a reactor were charged o-dichlorobenzene (70 parts), 1-methylamino-4-bromoanthraquinone (15.8 parts), N-propionyl-p-toluidine (8.8 parts), sodium hydrogencarbonate (10.5 parts) and cuprous chloride (0.5 part), and the mixture was kept at 135° to 140° C. under a nitrogen gas atmosphere for 8 hours, during which water generated was separated from an azeotropic mixture by a separater. After the reaction was over, o-dichlorobenzene was recovered by steam distillation. The residue was cooled, and the precipitate produced was filtrated, washed with water (100 parts), and dried at 80° to 90° C. to obtain a dry cake (18.3 parts, yield 95.5% based on 1-methylamino-4-bromoanthraquinone charged).

The resulting dry cake was subjected to hydrolysis in the same manner as in Example 24, thereby obtaining 1-methylamino-4-(4'-methylanilino)anthraquinone (16.2 parts, yield 95% based on 1-methylamino-4-bromoanthraquinone charged).

This compound showed a single spot, when thin-layer-chromatographed, and LC analysis value was 99.1%.

Comparative Example 12

In a reactor were charged p-toluidine (80 parts), 1-methylamino-4-bromoanthraquinone (15.8 parts), sodium acetate (7.5 parts) and copper acetate (0.5 part) and the mixture was kept at 115° to 120° C. for 6 hours under a nitrogen atmosphere. Thereafter, the reaction mixture was diluted with methanol (100 parts) and cooled. The precipitate produced was filtrated, washed with methanol (500 parts) and then water (200 parts), and dried at 80° to 90° C. to obtain 1-methylamino-4- (4'-methylanilino) -anthraquinone (yield 82% ).

We claim:

1. A process for producing an anthrapyridone compound represented by the formula (I):

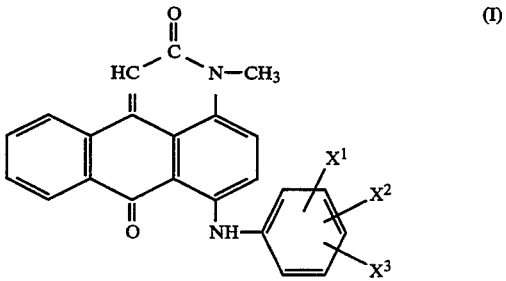

wherein
if X$^1$ and X$^2$ are hydrogen, X$^3$ is selected from the group consisting of chloro and methyl; and
if X$^2$ and X$^3$ are hydrogen, X$^1$ is —SO$_2$N(CH$_3$)$_2$;

said process comprising the steps of:
reacting an alpha-haloanthrapyridone compound represented by the formula (III):

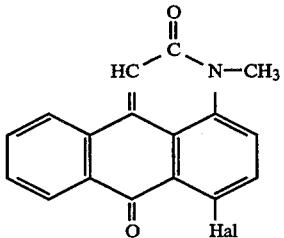

wherein Hal is halogen, with a compound represented by formula (VI):

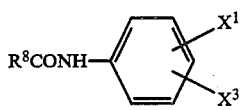

wherein $X^1$ and $X^3$ are as defined above, and $R^8$ is $C_{1-4}$ alkyl, in the presence of at least one of a metallic copper and a copper compound, and wherein said compound (VI) is reacted in an amount of 1.1 to 1.6 moles per mole of said compound (III); and hydrolyzing the resulting compound represented by formula (VII):

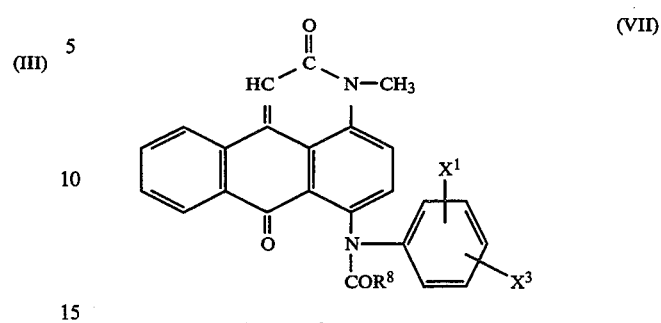

wherein $R^8$, $X^1$ and $X^3$ are as defined above, in an aqueous acidic solution.

2. The process according to claim 1, wherein the reaction is carried out at a temperature of 100° to 170° C.

3. The process according to claim 1, wherein said alpha-haloanthrapyridone compound is N-methyl-4-bromo-1,9-anthrapyridone.

4. The process according to claim 1, wherein compound (VI) is selected from the group consisting of a chloroacetanilide, a methylacetanilide and an N,N-dimethylaminosulfonylacetanilide.

* * * * *

UNITED STATES PATENT AND TRADEMARK OFFICE
CERTIFICATE OF CORRECTION

PATENT NO. : 5,367,075
DATED : November 22, 1994
INVENTOR(S) : Toshio Nakamatsu et al

It is certified that error appears in the above-indentified patent and that said Letters Patent is hereby corrected as shown below:

On cover page, item [63], line 3, delete "Nov. 11, 1989" should read —Nov. 01, 1989—

Signed and Sealed this

Thirty-first Day of January, 1995

*Attest:*

BRUCE LEHMAN

*Attesting Officer*   Commissioner of Patents and Trademarks